United States Patent [19]

Saba

[11] 3,748,405

[45] July 24, 1973

[54] KEY TELEPHONE SYSTEM LINE CIRCUIT

[75] Inventor: Philip B. Saba, Rochester, N.Y.

[73] Assignee: Stromberg-Carlson Corporation, Rochester, N.Y.

[22] Filed: June 15, 1972

[21] Appl. No.: 263,342

[52] U.S. Cl. .......... 179/99
[51] Int. Cl. .......... H04m 1/00
[58] Field of Search .......... 179/99, 81 R

[56] References Cited

UNITED STATES PATENTS

| | | | |
|---|---|---|---|
| 2,273,530 | 2/1942 | King | 179/99 |
| 3,649,772 | 3/1972 | Fitzsimons et al. | 179/99 |
| 3,676,608 | 7/1972 | Goldthorp et al. | 179/99 |
| 2,069,038 | 1/1937 | LaBaugh | 179/81 R |

*Primary Examiner*—Kathleen H. Claffy
*Assistant Examiner*—Kenneth D. Baugh
*Attorney*—Charles C. Krawczyk

[57] ABSTRACT

A key telephone system line circuit provides the supervisory and control functions for initiating and terminating local signalling to a key telephone set and for placing the associated line in and out of hold conditions.

Contacts of the line relay of the line circuit are connected in series with the dummy load placed across the telephone line during hold conditions to provide a positive release of the telephone line in response to a momentary change in line potential generated by the telephone switching center as a result of the outside party hanging up while the line is on hold.

6 Claims, 1 Drawing Figure

PATENTED JUL 24 1973
3,748,405
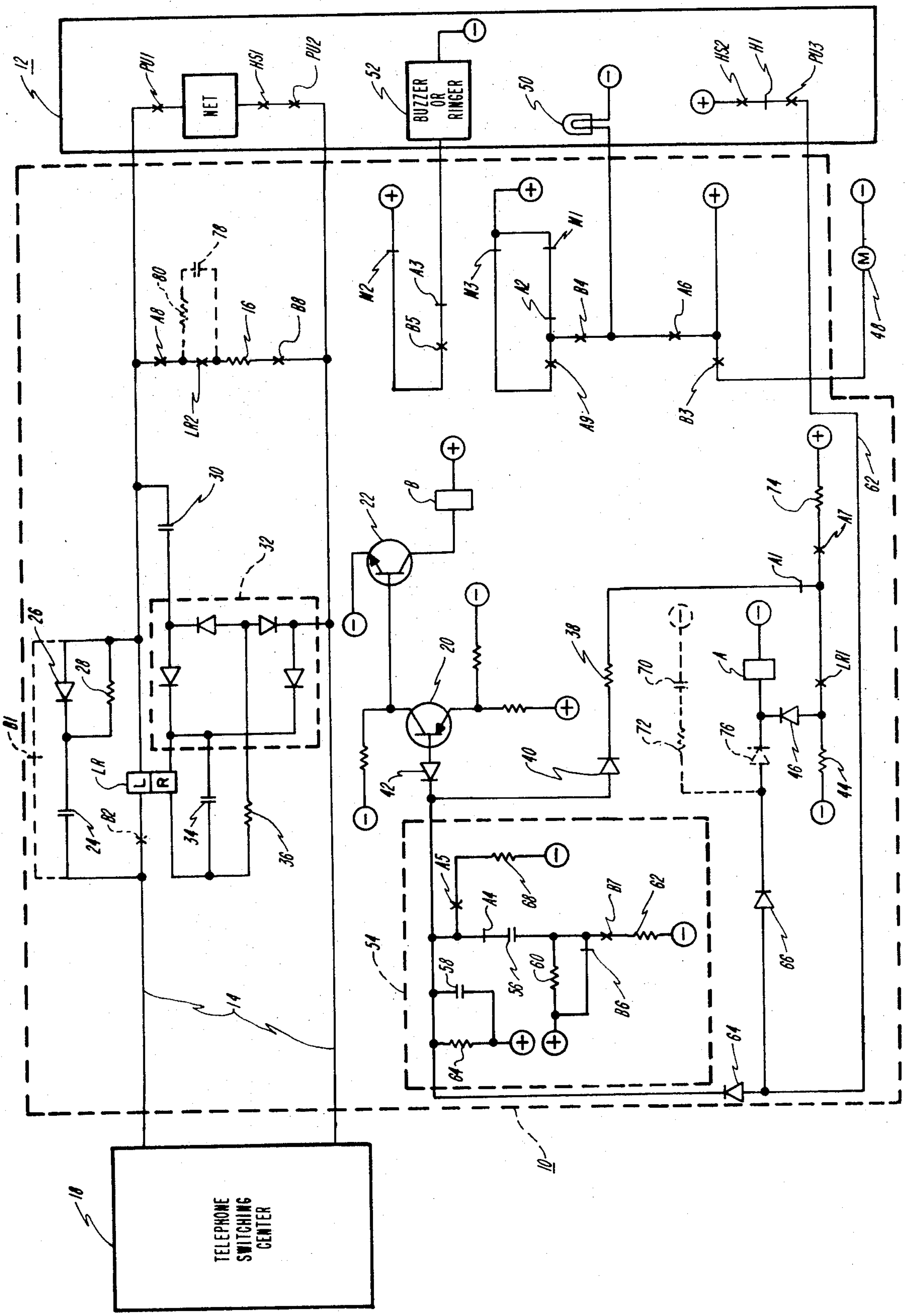

KEY TELEPHONE SYSTEM LINE CIRCUIT

BACKGROUND OF THE INVENTION

This invention relates to telephone line circuits in general and more particularly to line circuits for key telephone systems.

Telephone line circuits provide supervisory and control functions ancillary to the establishment of a connection between a telephone line and associated switching equipment. For instance in a key telephone system a single telephone line may be connectable to a plurality of key telephone sets and a single key telephone set may be connectable to any one of a plurality of telephone lines. In the latter situation local signalling means must be provided for indicating to the key telephone subscriber the telephone line over which an incoming call is being placed so that the telephone set can be connected thereto. Means must be further provided for terminating the local signalling when the call is answered upon establishment of the connection. Means must also be provided to permit the subscriber to hold a telephone line seized from the telephone switching center while the telephone set is temporarily disconnected from the telephone line so that the subscriber can converse with a different party via another telephone line during the hold condition and means must be provided to also remove the hold condition when desired. The foregoing means are all provided by the well known line circuit associated with each individual line in a key telephone system. The line circuit responds to appropriate signals from the telephone line and the connected key telephone set to perform the aforementioned functions.

In a U. S. Pat. No. 3,436,488 issued to R. E. Barbato, et al., on Apr. 1, 1969, entitled "Line Circuit For a Telephone System Utilizing A Single Multifunction Supervisory Relay," a key telephone system line circuit is disclosed embodying circuit means whereby in the event that an outside party hangs up while on hold, the held telephone line is released from the telephone switching center in response to a momentary change in line potential such as a polarity reversal or total interruption of the DC voltage across the telephone line generated by the switching center. This release avoids tying up the line in a false busy condition while the key telephone subscriber maintains the line on hold and further avoids disabling the use of the line indefinitely should the subscriber inadvertently forget about the hold condition after the outside party has hung up. Unfortunately, it has been found out that this desired releame does not always occur. With present key telephone system line circuits, the momentary change in line potential by the switching center has proven to be insufficient on many occasions to release the telephone line from the hold condition. As a consequence, the telephone line is maintained busy even though the outside party is no longer connected.

An improvement upon the Barbato, et al teachings is a simplified line circuit which is taught in a patent entitled "Key System Line Card Circuit" (No. 3,647,983) issued to A. R. Fitzsimons, et al. on Mar. 7, 1972. The arrangement taught therein also does not provide a positive release of a held telephone line when the outside party hangs up during a hold condition. One type of line circuit which does provide such a positive release is disclosed in a copending application (Ser. No. 101,479) entitled "Telephone Line Circuit Embodying A Triggerable Avalanche Device," filed on Dec. 28, 1970 on behalf of G. H. Davis, et al.

Unfortunatley, the Davis, et al. and Fitzsimons, et al. circuits both have an inherent disadvantage not found in the Barbato, et al. circuit wherein the line relay used for detecting closed loop conditions through the flow of DC line current is always connected in the circuit. Consequently the relay is operated needlessly in a pulsing fashion every time dial pulses pass through its winding whenever a call is made from the key telephone set over the telephone line. This causes unnecessary wear thereby shortening the life of the relay. Furthermore the dial pulses are distorted by virtue of their passing through the winding inductance and bypass capacitance which may produce erroneous connections, particularly with regard to long telephone lines.

With the foregoing in mind, an object of this invention is to provide a new and improved line circuit for key telephone systems.

It is a further object of this invention to provide a new and improved line circuit for key telephone systems which provides a positive release of a held telephone line in response to a momentary change in line potential.

It is still a further object of this invention to provide a new and improved line circuit for key telephone systems which provides a positive release of a held telephone line wherein the circuit overcomes the disadvantages of always maintaining the line relay in an operable state.

BRIEF DESCRIPTION OF THE INVENTION

In accordance with the invention the key telephone system line circuit provides the necessary supervisory and control functions for initiating local signalling to a key telephone set in response to ringing signals on the associated telephone line, for terminating the signalling when the call is answered and for placing the line in and out of hold conditions under the control of the key telephone subscriber.

The arrangement of the key telephone system line circuit is such that once the line relay provided for detecting the flow of DC line current is deactuated in response to a momentary change in line potential during a hold condition it cannot be reactuated. Normally open contacts of the line relay are connected in series with the dummy load which is placed across the line during hold conditions so that when the relay is deactuated the contacts are opened to break the only path for DC current to flow. Consequently the line relay cannot be reactuated since there is no longer any energizing current to operate it.

An additional feature of the invention permits disconnecting the line relay from the circuit when the relay is not required for monitoring so that dial pulses are not distorted nor are the relay contacts operated unnecessarily.

BRIEF DESCRIPTION OF THE DRAWING

The drawing depicts schematically the line circuit of the invention used in conjunction with a single key telephone set.

DETAILED DESCRIPTION OF THE INVENTION

The single drawing illustrates schematically a single line circuit 10 of a key telephone system used for interconnecting any one of a plurality of key telephone sets 12 (only one shown) with an associated telephone line 14. The line circuit 10 is used for controlling local signalling to the telephone set 12 when an incoming call is present on the telephone line 14 and for later placing the telephone line in and out of hold conditions in response to signals from the telephone set 12. While in a hold condition the telephone line 14 is held seized through a dummy load 16 which functions as a terminating impedance for the line 14 to provide a closed loop to the telephone switching center 18. This is necessary since line 14 is not connected to the telephone set 12 during hold conditions and a closed loop must always be maintained to hold a telephone line seized.

When the line circuit 10 is in an idle circuit condition, (no telephone call present on the telephone line 14) the relays LR, A and B are deactuated, and the transistors 20 and 22 are non-conducting. When the telephone line 14 is initially seized by the telephone switching center 18 a ringing signal consisting of an intermittent AC voltage is applied in series with a DC potential to the line 14 to indicate an incoming call thereon. Although no DC current can flow through the line 14 until the call is answered, AC ringing current passes initially through a capacitor 24 connected in series with a parallel combination of a diode 26 and a resistor 28, and a capacitor 30 to a full wave four diode rectifier bridge 32. Although some ringing current does flow through the L winding of relay LR (primarily when the diode 26 is back biased by the ringing signal) the L winding is not relied upon to operate relay LR during ringing. The AC ringing signal is rectified by the rectifier bridge 32 to provide a DC current which is filtered by a capacitor 34 and resistor 36 combination, to energize the R coil of the relay LR thereby actuating the relay. If desired, a short circuit path via normally closed contacts B1 of relay B (the letter of the contacts designation identifies which relay controls the contacts) can be placed across the L winding of relay LR to function in conjunction with normally open contacts B2 located in series with the L winding. With this optional feature the actuation of the relay LR by energizing the L winding is enabled only while the relay B is actuated. This has the advantage of providing a low impedance metallic path between the line circuit 10 and the switching center 18 for dial pulses generated when the key telephone subscriber initiates a telephone call using line 14. With this feature dial pulses are not distorted since they do not pass through winding L of relay LR and additionally relay contact wear is reduced extending the life of the relay.

When relay LR operates in response to the ringing signal, its contacts LR1 close to provide a forward bias potential to the base of transistor 20 through a series path which includes normally closed contacts A1 of relay A, a resistor 38 and diodes 40 and 42 from negative power terminals (DC current flows between negative and positive power terminals through any closed path of the circuit) via a resistor 44 in parallel with the series combination of relay A and diode 46. The impedance of the biasing path keeps the current through relay A below its operating level so that it is not actuated at this time. The operation of transistor 20 applies a forward bias potential to the base of transistor 22, which renders the transistor 22 conductive to energize the relay B causing it to operate.

The operation of relay B initiates local signalling from the line circuit 10 to the key telephone set 12 to apprise the subscriber of an imcoming call on the telephone line 14. For example, contacts B3 close to complete a circuit for operating an interrupter motor 48 for controlling the generation of intermittent audible and visual signals. The closing of contacts B4 energizes a line lamp 50 of the telephone set through normally closed contacts A2 and the slow interrupter contacts M1 of the motor 48 to cause the lamp 50 to flash periodically at a slow rate. An interrupted audible signal is provided by a buzzer or ringer 52 in the telephone set 12 by providing a closed circuit for it to operate through contacts B5, normally closed contacts A3 and the interrupter contacts M2 of the motor 48. The transistors 20 and 22 remain conductive and the relays LR and B are actuated until the telephone call is answered by connecting the telephone set 12 to the telephone line 14.

A time delay circuit 54 is used in the line circuit 10 to prevent false signalling in the telephone set 12 which might otherwise be triggered by transient signals such as noise inadvertently turning on the transistor 20 even though the transistor is not connected to the telephone line 14. Two capacitors, 56 and 58, must first be charged up to predetermined values through the closed contacts LR1 before transistor 20 is sufficiently biased to turn on, which causes relay B to operate and initiates local signalling. Once relay B operates, contacts B6 and B7 are actuated to provide a voltage divider circuit comprising resistors 60 and 62 which renders the transistor 20 fully conductive to ensure the operation of relay B. The time delay circuit 54 also permits continuous local signalling to the telephone set 12 for periods of up to 30 seconds, for instance, in response to a single ringing signal spurt of perhaps one second applied to the telephone line 14. Although the capacitor 56 charges up quickly via contacts LR1 while the relay LR is energized by the ringing signal, it discharges slowly through a series path comprising resistors 60 and 64 in the absence of the ringing signal so that the transistor 20 and relay B are actuated for a predetermined period in between ringing signal spurts. Each spurt recharges the capacitor 56 so that local signalling is maintained enve though the ringing signal might not be continuous. This is highly advantageous in those systems wherein the ringing signal is provided under the manual control of an operator. If the caller hangs up before the call is answered the ringing signal applied to the telephone line 14 from the switching center 18 is removed deactuating the relay LR. Capacitor 56 eventually discharges to a level insufficient to forward bias transistor 20 so that both this transistor and relay B are deactuated and local signalling to the telephone set 12 is terminated.

To answer the call, the handset of the telephone set 12 is lifted from its cradle to the "off-hook" position which closes the hookswitch contacts HS1, and a pickup button associated with line 14 is depressed to close contacts PU1 and PU2 which completes the connection between the set 12 and the telephone line 14 so that conversation may take place.

The line circuit 10 is controlled by signals from the telephone key set 12 via a lead 62 connected in series with normally open hookswitch contacts HS2 and pickup contacts PU3 and normally closed hold contacts H1. When the telephone set 12 is connected to line 14 all three of these contacts are closed so that a positive potential is applied to the line circuit 10 over lead 62 to provide an off-hook signal indicating that the telephone call has been answered. A negative potential could be used just as well with appropriate modifications made in the design of line circuit 10.

The positive potential off-hook signal is applied to the base of transistor 20 through a diode 64 which cuts off this transistor and consequently deactuates relay B. The off-hook signal is also applied to relay A through a diode 66 causing the relay A to operate. Contacts A4 open to disconnect the capacitor 56 from the base of transistor 20 and contacts A5 close to apply a negative potential forward bias to the transistor 20 base through a resistor 68. The transistor 20 remains cut off at this time because of the overriding effect of the positive potential which is applied directly to its base via lead 62.

With relay A actuated and relay B deactuated local signalling to the key set 12 is removed. Contacts B5 open to terminate the audible signal produced by the buzzer or ringer 52. Contacts B3 open to stop the interrupter motor 48 and contacts B4 open and contacts A6 close so that line lamp 50 is now continuously energized.

If optional contacts B1 and B2 are used, then relay LR is also deactuated at this time. If these contacts are used then a capacitor 70 is required for the line circuit 10 to function properly. The capacitor 70 is charged up through a resistor 72 when the positive potential off-hook signal is applied and is discharged when the positive potential is removed. Its function will be explained shortly.

It is sometimes necessary for the key telephone subscriber to place the outside party on hold in order to speak to someone else via another telephone line. To accomplish this, the subscriber pushes a hold button and then subsequently operates another pickup button to select the other line. Operating the hold button opens the contacts H1 removing the positive potential applied to the line circuit via lead 62. The absence of a positive potential provides a hold signal to which the line circuit responds by causing the telephone line 14 to be placed in a hold condition.

With the positive potential removed from lead 62 the negative potential applied to the base of transistor 20 via resistor 68 turns on transistor 20 which causes relay B to be reactuated. This actuates contacts B1 and B2 (if used) thereby permitting relay LR to be reactuated by a DC current flow through the L winding of relay LR and the key telephone set 12. The typical sequencing arrangement in a key telephone system is such that the positive potential via lead 62 is removed by the opening of contacts H1 when the hold button is depressed but the physical disconnection from the telephone line 14 by opening of the pickup contacts PU1 and PU2 is made only when the hold button is released thereafter. Since the telephone line 14 is connected to the telephone set 12 for a brief period of time following the depression of the hold button there is adequate time for relays B and LR to reoperate before the physical disconnection from the line occurs. If contacts B1 and B2 are not used then relay LR is not reactuated but merely remains actuated when the line 14 is put in a hold condition.

Once relay LR is operated, relay A is maintained actuated through contacts LR1 from a positive potential via contacts A7 and a resistor 74. When the contacts B1 and B2 are used, a brief interval exists wherein the positive potential off hook signal is removed (immediately following depression of the hold button) and relay LR is not yet operated. During this interval, relay A remains energized by the discharge current from capacitor 70 through resistor 72 and a diode 76. Once relay LR operates relay A is energized through contacts LR1. Contacts A1 are open at this time so that the positive potential cannot be applied to the base of transistor 20.

With all three relays A, B and LR now operated, the contacts A8, B8 and LR2 are closed connecting the dummy load 16 across the telephone line 14. The dummy load 16 imparts a load across the line 14 which replaces the electrical loading of the key telephone set 12 the latter now, of course, being disconnected from the telephone line 14. The effect is that the telephone switching center 18 continues to see a closed loop and therefore holds the line 14 seized. The outside party is now placed in a hold condition with the line 14 seized awaiting reconnection to the telephone set 12. Both of the relays A and B are operated at this time so that the line lamp 50 is now energized through fast interrupter contacts M3 of interrupter motor 48 via contacts A9 and contacts B4 which provides a rapid flashing signal indicating that the telephone line 14 is on hold.

If the outside party placed in a hold condition decides to abandon his call, he hangs up his telephone. Within the telephone switching center 18, a momentary change in line potential such as a polarity reversal or total interruption is generated. This momentary change in line potential is of sufficient time duration (such as, for example, 0.8millisecond), to release the relay LR. Once released during a hold condition the LR relay cannot be reoperated since no closed loop exists thereafter for DC current to flow from the switching center 18 through the LR relay. Contacts LR2 are open so that current cannot flow through the dummy load 16 and no current can flow through the telephone set 12 since it is now physically disconnected from the telephone line 14. Consequently the line is released back to an idle condition waiting to be seized again by the center 18. A capacitor 78 in series with a resistor 80 can be connected across the contacts LR2 if contact protection is required in interrupting line current.

With contacts LR1 open, the energizing path for relay A is interrupted so that relay A is released. The opening of contacts A5 following thereafter removes the forward bias potential from transistor 20 which causes relay B to be deenergized. With relays A, B, and LR deactuated the line circuit 10 returns to a quiescent state.

The line circuit of the invention provides a positive release of the seized telephone line 14 in response to a momentary change in line potential from the center 18 indicating that a held party has hung up. This positive release of the telephone line 14 is accomplished by the incorporation of relay LR contacts into the DC holding path via the dummy load 16. The terminology "positive release" means that when the telephone switching center 18 signals for the release of the telephone line 14 from a hold condition and the relay LR momentarily opens it cannot be reoperated so that the held line 14 is released. One is assured, therefore, that the line 14 will not be inadvertently left in an undesirable busy condition when the outside party hangs up and the key telephone subscriber forgets about the call. Furthermore with the optional feature of switching the line relay winding into the circuit only when it is required for monitoring, the relay wear is reduced and dial pulse distortion is minimized. Thus the line circuit 10 overcomes the disadvantages of the Barbato, et al., Fitzsimons, et al. and Davis, et al. circuits.

To remove the hold condition himself, the key telephone subscriber merely reoperates the pickup button associated with line 14, which closes the contacts PU1, PU2 and PU3 causing the telephone set 12 to be reconnected to the telephone line 14. The positive potential off hook signal via lead 62 cuts off transistor 20 deactuating relay B which results in the dummy load 16 being no longer connected across the line 14 upon opening of contacts B8. Conversation may then resume via line 14.

What is claimed is:

1. An improved line circuit for interconnecting a key telephone set with a telephone line wherein a line relay is connected in series with the telephone line to be actuated by the flow of DC current therethrough and a dummy load is placed across the line in response to a hold signal from the key telephone to hold the line seized while the telephone set is temporarily disconnected therefrom, the improvement comprising contacts of the line relay connected in series with the dummy load.

2. A line circuit for interconnecting a key telephone set with a telephone line wherein the telephone set generates an off-hook signal when it is connected to the telephone line and a hold signal when it is disconnected therefrom while the line is held seized, comprising:

first circuit means including a first relay connected so that said first relay is actuated by either ringing signals or a DC current flow through the telephone line;

second circuit means including a second relay which is actuated in response to the off-hook signal and is maintained actuated through contacts of said first relay when the hold signal is present;

third circuit means including a third relay which is actuated through contacts of said first relay during ringing and through contacts of said second relay when the hold signal is present and is deactuated by the off-hook signal, and a dummy load for connection across the telephone line through contacts of said first, second and third relays.

3. The line circuit of claim 2 wherein said first relay has two windings, one connected in series with the telephone line for energization by the flow of DC current therethrough and the other winding connected across the telephone line for energization by ringing signals.

4. The line circuit of claim 3 wherein the series connected winding of said first relay is inhibited from operating while said third relay is deactuated, and said second circuit means momentarily provides energizing current for operating said second relay until said first relay is actuated after the hold signal is generated.

5. The line circuit of claim 2 including signalling means responsive to the simultaneous actuation of said third relay and deactuation of said second relay for providing local signalling to the key telephone set.

6. The line circuit of claim 2 including circuit means connected across said first relay contacts used to switch said dummy load for providing a current shunt path when said contacts interrupt the flow of DC current.

* * * * *